INVENTORS:
JOHN W. DANIELS,
INGEMAR R.V. TAEGTSTROEM
BY CHANGE OF NAME
RALPH TEXTROM
BY Homer R. Montague
ATTORNEY May 20, 1958 J. W. DANIELS ET AL 2,835,793

LOCKING SWITCH AND RELIEF VALVE FOR COMPACT RADIO EQUIPMENT

Filed June 20, 1952 2 Sheets-Sheet 2

INVENTORS
JOHN W. DANIELS,
INGEMAR R. V. TAEGTSTROEM,
BY CHANGE OF NAME
RALPH TEXTROM

BY Homer R. Montague
ATTORNEY 2,835,793
Patented May 20, 1958

2,835,793

LOCKING SWITCH AND RELIEF VALVE FOR COMPACT RADIO EQUIPMENT

John W. Daniels, Alhambra, and Ingemar R. V. Taegtstroem, Los Angeles, Calif.; said Taegtstroem, now by change of name Ralph Textrom, assignors to Hoffman Electronics Corporation, Los Angeles, Calif., a corporation of California Application June 20, 1952, Serial No. 294,748

4 Claims. (Cl. 250—16)

Figure 1:
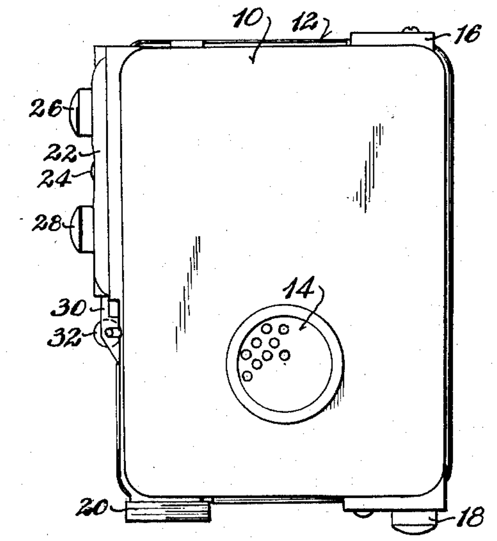

This inventions pertains to compact, portable radio equipment, and more particularly to a combined control switch, switch locking means and pressure-equalizing valve structure for such equipment.

Full utilization of radio communication techniques by military and other users has involved an increasing need for extremely small and light radio apparatus. Great strides have been made in the development of miniaturized electronic components, but the effective use of these techniques requires similar reduction in the size of associated electrical and mechanical parts. At the same time, the reductions in size accomplished carry with them requirements for mechanical design which are difficult due in part to reduced strength of certain parts, and the necessity that manual control elements, such as switches and the like, must not be made so tiny that operation is difficult. Thus, under field conditions, gloved personnel must be able to perform the necessary control operations without hindrance. At the same time, parts must not project unduly from the casing of the equipment, both for reasons of ruggedness and of small size. Inasmuch as small and compact equipments are more likely to be subjected to rough handling, the requirements are made additionally difficult to satisfy.

In the case of equipments which are substantially sealed for protection against moisture, fungus and the like, and which incorporate speakers, microphones or the like having diaphragm elements which lie in the casing walls, proper operation requires that such elements be relatively free from constant pressure differences such as might arise from altitude changes or barometric differences generally. Numerous efforts have been made to achieve this pressure equalization automatically, but have always involved more or less complicated structures.

It is a principal object of the present invention to provide a design for certain of the control portions of small, compact radio equipments which will satisfy the requirements outlined above. More particularly, it is an object of the invention to provide a control switch, such as a transmit-receive switch, for a portable transceiver, which will be easily operable under adverse use conditions, and which will permit the casing of the apparatus to remain effectively sealed against attacks of climate and the like.

A further object of the invention is to provide a switch of the type described with means by which the operating buttons may be operated in a momentary manner, as in the case of a push-button, but may also be locked into any desired positions for continued operation under selected conditions (such as "transmit" or "receive," for instance), and may also be locked against fortuitous operation as for storage or like purposes.

Still another object of the invention is to provide equipment of the above type in which equalization of pressure, as between the inside and outside of sealed casings, is accomplished as an incident to the operation of the locking and unlocking provisions, such action being automatic in the sense that the user need not be conscious of its accomplishment. The means provided to this end are such that the sealed casing cannot normally be left in an un-sealed condition either during use or storage, so that the effectiveness of the protective sealing is not compromised.

An additional object of the invention is to provide, in an apparatus of the class described above, an improved and highly miniaturized contact arrangement and structure which is especially characterized by reliability in operation, ruggedness, long life and relative economy of manufacture in mass production.

Figure 2:
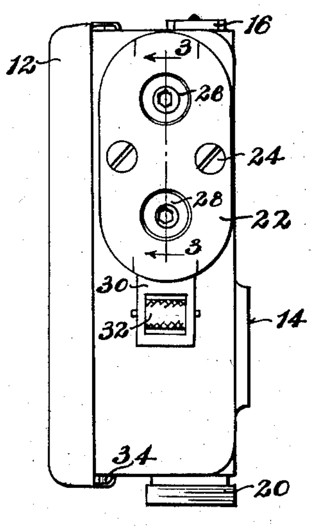
Figure 3:
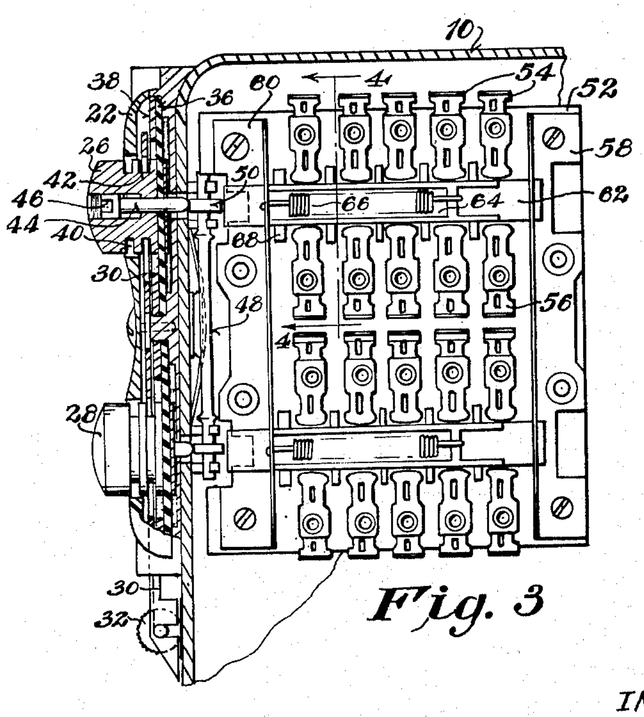
Figure 4:
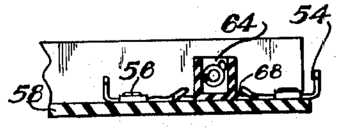
Figure 5:
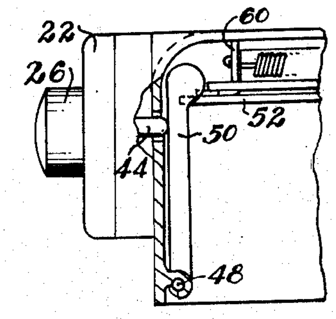
Figure 6:
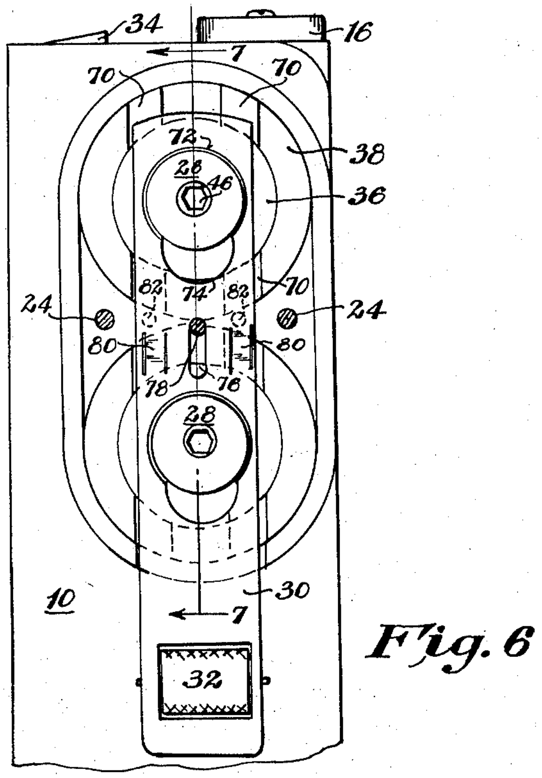
Figure 7:
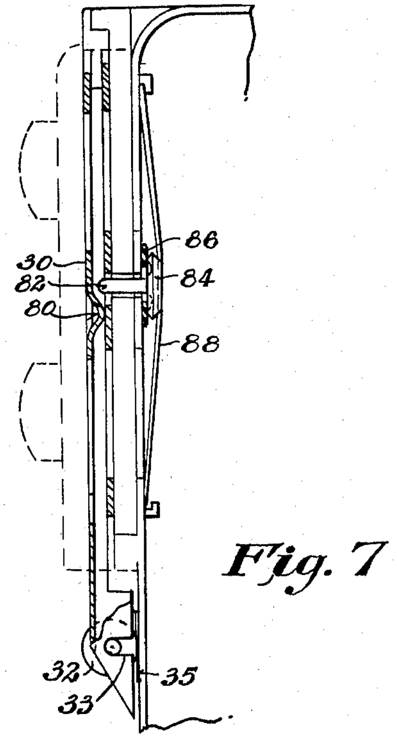
Figure 8:
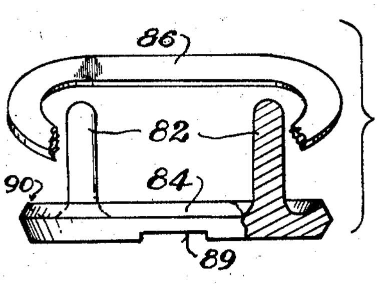
Figure 9:
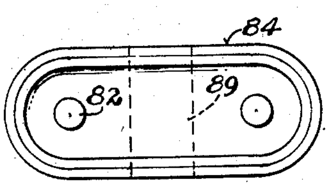

The above and other objects and advantages of the invention will best be understood by referring to the following detailed specification of a preferred embodiment thereof, taken in connection with the appended drawings, in which:

Fig. 1 is a side elevational view of a compact radio transceiver incorporating the novel structure, Fig. 2 is a side view thereof, Fig. 3 is an enlarged fragmentary view of the upper left corner of the Fig. 1 construction, the casing wall being broken away and parts shown in section, Fig. 4 is a fragmentary sectional view through one of the contact slides of Fig. 3, Fig. 5 is a fragmentary sectional view taken horizontallly through one of the operating buttons of Fig. 3, Fig. 6 is an enlarged view of the upper portion of Fig. 2, with the casing cover removed and a portion of the operating button cover also removed, Fig. 7 is a sectional view taken on line 7—7 of Fig. 6, with parts shown in phantom lines and other parts omitted for clarity, Fig. 8 is an exploded perspective view of the valve element and sealing washer of the device, and Fig. 9 is a top view of the same valve element.

Some of the problems associated with the solution of the difficulties mentioned above may better be appreciated from the fact that in the equipment to be described, provision is made for both transmission and reception of radio messages on very high or ultra high frequency wave bands, and that the complete equipment, exclusive of batteries, is contained in a casing approximately 3 by 4 by slightly over 1 inch in size, and capable of fitting nicely into the user's hand.

Referring now to Figs. 1 and 2 of the drawings, there is shown a compact radio transceiver comprising a casing 10 forming five walls, the sixth wall being constituted by a cover 12 suitably gasketed for sealing the casing and held in place as by fingers engaging lugs on the casing or some comparable arrangement. A combined speaker and microphone grill is provided on one major casing wall and indicated by numberal 14, while the button top of an extendable antenna is shown at 16. An operating ejector button for this antenna is provided as at 18, while 20 designates a connector member to which a suitable battery connector may be attached.

Upon one side wall of casing 10 there is located a cover plate 22 secured in place as by screws 24, and through which project a pair of control buttons 26 and 28 which, in the present equipment, are adapted to condition the radio circuits within the casing for transmission or reception of signals. These buttons 26, 28 can be locked in either their up or down condition by means of a locking slide 30 moved laterally along the casing wall as by a traction roller 32 adapted for thumb operation. One of the cover-securing lugs is shown at numberal 34, and to better advantage in Fig. 6 of the drawings.

Referring now to Fig. 3 of the drawings, one of the buttons 26 is shown in section, together with its associated parts. Since the buttons 26 and 28, and parts associated therewith, are duplicates of one another, a detailed description of one will suffice to make the construction clear. Button 26 has securely fastened thereto a flexible circular washer or diaphragm 36, for example of rubber, synthetic rubber or the like, and this diaphragm 36 is seated in a suitable recess formed, for example, in a thickened portion of the wall of casing 10. A rigid washer or annular disc 38 overlies the diaphragm 36, which is thus clamped to the casing at its peripheral portion only, so that the central portion and the attached button 26 are free to flex inwardly and outwardly. The bottom of the recess accommodating diaphragm 36 is relieved to this end. If desired, a spring washer (not shown) may overlie washer 38, and the assemblage is held in position as by the cover plate 22.

It will be seen from Fig. 6 that the dimensions of the parts just described are such that the washers 38 are nearly tangent to one another. Returning now to Fig. 3, it will be noted that each of the buttons 26 and 28 is provided with a pair of spaced annular grooves 40 and 42 adapted to receive a locking portion of the locking slide 30 when the latter is moved upwardly in Fig. 3; this arrangement will be described in detail below. Each operating button 26, 28 carries an inwardly extending pin 44 having a head portion 46 threadedly received in a socket in the outer button face. The headed portion is provided with a socket of hexagonal or equivalent shape to permit adjustment by a suitable tool.

On the inside casing wall there is journalled an axle 48 which extends beneath both inner ends of the pins 44 of the buttons; this axle may for example be staked in position in lugs integral with the casing wall, and carries loosely a pair of levers 50 which are engageable with the inner ends of the pins 44 and movable thereby when either button is depressed, one lever 50 being movable by each button. Suitably mounted within the casing is a chassis plate 52 upon which the electronic components of the device are mounted, but since the arrangements of these latter parts forms no part of the present invention, a detailed description thereof is omitted. However, this chassis plate carries a switch arrangement comprising parallel double rows of fixed contacts 54 and 56 secured to plate 52 as by rivets, and these contacts are wired or connected to the various circuit components which need to be changed during operation of the device.

In order to provide for completion of the connections through the fixed contacts 54 and 56, there are provided a pair of spaced angle brackets 58 and 60, suitably apertured to receive in a sliding fashion the end portions of a slide 62 formed of insulating material. Intermediate its ends, this slide is formed in the shape of a channel (see also Fig. 4), and a tension spring 66 is connected between one end wall of this channel and the bracket 60, so that the slide 62 is urged to the left in Fig. 3. Each slide carries, approximately in the plane of the fixed contact elements, a series of bridging contacts such as 68, and the arrangement is such that when the slide 62 is urged to the right against the tension of its spring, a contact 68 engages a pair of corresponding fixed contacts and thus completes a desired circuit. The left end of each slide 62 is disposed adjacent the upper end of one of the levers 50 (Fig. 5) so that operation of each button 26 or 28 pushes one of the slides to achieve the desired switching operation.

The manner in which locking slide 30 operates to lock both buttons in any desired operational combination is best shown in Figs. 6 and 7, to which reference is now made. As there shown, each of the rigid washers 38 is provided with a pair of spaced grooves or wide slots 70 within which may slide the down-turned lateral edges of the slide 30. The lower end of the cover 22, not shown in these figures, is of course grooved to pass the end of the slide. The slide 30 has a pair of circular apertures such as 72 of a diameter which will pass the bodies of the buttons 26 and 28, and intersecting each of these apertures 72 is a smaller circular aperture 74 adapted to pass the reduced diameters of the buttons at their annular grooves 40 and 42 described above. These composite apertures are thus somewhat of keyhole shape, and when the slide 30 is in the position shown in Fig. 6, either button 26 or 28 may be depressed to condition the radio device as desired, for example for transmission or reception. Upon release, the buttons spring outwardly to restore the switch contacts to their normal positions. However, if slide 30 is moved upwardly in Fig. 6, the buttons 26 and 28 will be locked against axial movement in whatever position they occupy at the time the slide is moved to locking position. A short slot 76 in between the buttons 26 and 28 is adapted to receive a guide pin 78 which depends from the button cover 22 to guide and limit the slide movement.

Bearing in mind that the diameter of each button is of the order of three eighths of an inch, it is clear that considerable difficulty might be experienced in operating the slide 30, because of the small size of its projecting part, and also because of the fact that it lies quite close to the wall of the casing 10. The difficulty would be especially pronounced if the user's fingers were stiff, or if he were wearing gloves as would often be the case with such portable equipment. To overcome this, the invention provides a novel arrangement including the traction roller 32, which is preferably knurled and whose axle pin is received in a pair of open slots 33 in the down-turned side edges of the slide 30. This roller 32 is dimensioned to contact the surface of the casing wall when thumb pressure is applied to the roller, and the underlying portion of the casing wall may advantageously be provided with a frictional area 35 formed of rubber, plastic or the like suitably secured thereto. Thus, the user need only push with some pressure upon the exposed portion of slide 30 and roller 32, in a direction lengthwise of the slide, whereupon traction roller 32 will roll upon the underlying surface and force the slide in the desired direction.

It has been stated that the casing 10, together with its cover 12, constitute in use a hermetically sealed assembly. Inasmuch as the transducer element 14, which may be a combined speaker and microphone or the like, will be sensitive to pressure differentials between the interior of the casing and its exterior environment, it is necessary to provide some means for equalizing this pressure at the time of use of the instrument. Complicated pressure-sensitive valves have been used for this purpose, but besides being undependable, they tend to allow the instrument to "breathe" with all pressure changes, whether the device is in use or not, so that the protection afforded by the sealing is reduced. The present invention provides for automatic pressure equalization when the device is in use, the sealing of the casing at all other times being maintained complete.

Referring to Figs. 6 to 9 of the drawings, there is shown a valve arrangement comprising a valve element 84 of rounded rectangular profile having a pair of parallel valve stems 82 passing through suitable apertures in the casing wall. The outer ends of these stems are disposed to be engaged by a pair of lateral projections 80 struck out from the plane of the slide 30, and so located that in either end position of the slide 30, the projections 80 do not contact the valve stems. The valve 84 is normally held tightly against a resilient oval washer 86 secured to the surface of the casing wall, so as to seal the aperture through which pass the valve stems themselves, a leaf spring 88 pressing against valve 84 for this purpose. The ends of spring 88 may be secured beneath lugs integral with the casing wall. It is apparent that the valve will be momentarily opened each time the locking slide 30 is moved from one of its positions to the other, and will be closed at all other times. Since normally the buttons 26 and 28 are locked in non-depressed positions for storage or shipment, the act of unlocking slide 30 will automatically effect the desired pressure equalization prior to use of the device.

To provide the best possible seal for valve 84, its edge which contacts the resilient washer 86 may be sharp, as indicated at 90 in Fig. 8, so that line contact under considerable unit pressure is achieved.

The manner in which the desired objects of the invention are satisfied by the construction shown and described herein is to be taken as exemplary, because various changes in details of construction and arrangement may be made without departing from the scope of the invention as defined in the appended claims.

What is claimed is:

1. In a portable radio apparatus, a sealed housing, an audio transducer element carried by a wall of said housing and including a moving member, said transducer element having inner and outer faces respectively in pressure communication with the interior and exterior of said housing, mechanically operable controls sealed to said housing but movable with respect thereto to control said apparatus, a locking member movable on said housing for locking and unlocking said controls, and a pressure relief valve in said housing disposed to be momentarily opened during each movement of said locking member in either direction whereby to equalize the pressure on the two faces of said transducer element.

2. The invention in accordance with claim 1, in which said pressure relief valve has a stem projecting through the wall of said casing, and said movable locking member has a laterally projecting portion for engagement with said stem at a point midway in the travel of said locking member.

3. The invention in accordance with claim 1, in which said relief valve is provided with a pair of stems passing through a wall of said housing, and in which said locking member has laterally deflected portions for engagement with said respective stems during the movement of said locking member.

4. In a radio wave transmitting and receiving apparatus, a housing, a pair of switch buttons on said housing adapted to be selectively depressed to energize transmitting and receiving circuits respectively, resilient means for normally urging both of said buttons to a raised position to deenergize said circuits whereby said circuits may be energized selectively by depression of one or the other of said buttons, each of said buttons having a pair of grooves spaced apart in the direction of button travel, a locking element mounted outside said housing and on an outer wall thereof, said locking element movably mounted with respect to said buttons to permit said element to slide in a direction perpendicular to the directions of movement of said buttons and having longitudinally spaced portions adapted to enter one groove in each button in one position of said locking element, whereby said buttons may both be locked individually in either depressed or elevated positions upon movement of the locking element to its operative position, said locking element having mounted at one end thereof a traction roller to engage said housing outer wall for moving said locking element backward and forward in response to rolling pressure exerted upon said roller.

References Cited in the file of this patent

UNITED STATES PATENTS

| | | |
|---|---|---|
| 84,811 | Farrar | Dec. 8, 1868 |
| 2,180,501 | Blood | Nov. 21, 1939 |
| 2,213,657 | Rowe | Sept. 3, 1940 |
| 2,285,986 | Kintzing | June 9, 1942 |
| 2,421,516 | Mitchell | June 3, 1947 |
| 2,439,411 | Mitchell | Apr. 13, 1948 |
| 2,514,913 | Tyrner | July 11, 1950 |
| 2,521,423 | Stuck | Sept. 5, 1950 |
| 2,579,168 | Ballou | Dec. 18, 1951 |
| 2,594,644 | Hansen | Apr. 29, 1952 |